United States Patent [19]
Stoneham

[11] Patent Number: 5,363,158
[45] Date of Patent: Nov. 8, 1994

[54] CAMERA INCLUDING OPTICAL ENCODING OF AUDIO INFORMATION

[75] Inventor: Jeffrey R. Stoneham, Spencerport, N.Y.

[73] Assignee: Eastman Kodak Company, Rochester, N.Y.

[21] Appl. No.: 110,660

[22] Filed: Aug. 19, 1993

[51] Int. Cl.$^5$ ............................................. G03B 29/00
[52] U.S. Cl. ..................................... 354/76; 352/27; 355/41; 369/96
[58] Field of Search ................. 354/21, 75, 76, 105, 354/106, 289.12; 352/26, 27, 28, 29, 30; 355/41; 369/92, 96, 97; 358/310, 311, 341, 342, 214; 360/14.1, 14.2, 14.3

[56] References Cited

U.S. PATENT DOCUMENTS

| | | | |
|---|---|---|---|
| 2,925,753 | 2/1960 | Schwartz et al. | 352/29 X |
| 3,046,836 | 7/1962 | Schwartz et al. | 352/27 X |
| 3,230,824 | 1/1966 | Schwartz et al. | 353/120 |
| 3,379,095 | 4/1968 | Kaprelian | 353/120 |
| 3,435,156 | 3/1969 | Schwartz et al. | 369/97 |
| 4,600,280 | 7/1986 | Clark | 352/27 X |
| 4,945,373 | 7/1990 | Hashimoto | 354/289.12 X |
| 4,983,996 | 1/1991 | Kinoshita | 354/76 |

FOREIGN PATENT DOCUMENTS 2-297535  12/1990  Japan .

*Primary Examiner*—Howard B. Blankenship
*Attorney, Agent, or Firm*—Marc A. Rossi

[57] ABSTRACT

A camera system is disclosed that optically records audio information on a photographic film containing corresponding image information. The camera system includes a user interface coupled to a camera control processor, a recording circuit coupled to the camera control processor and a microphone, an optical encoding circuit having an input coupled to the output of the recording circuit and an output coupled to an optical write head, a shutter mechanism, and a transport mechanism for advancing film past the shutter mechanism and the optical write head. In operation, the camera control processor, in response to command signals received from the user interface, controls the operation of the recording circuit, the optical encoding circuit, the optical write head, the shutter mechanism and the transport mechanism, to record audio segments of variable duration and to encode the audio segments as an audio film frame at a location adjacent to the last picture film frame as the transport mechanism advances film past the optical write head.

7 Claims, 6 Drawing Sheets

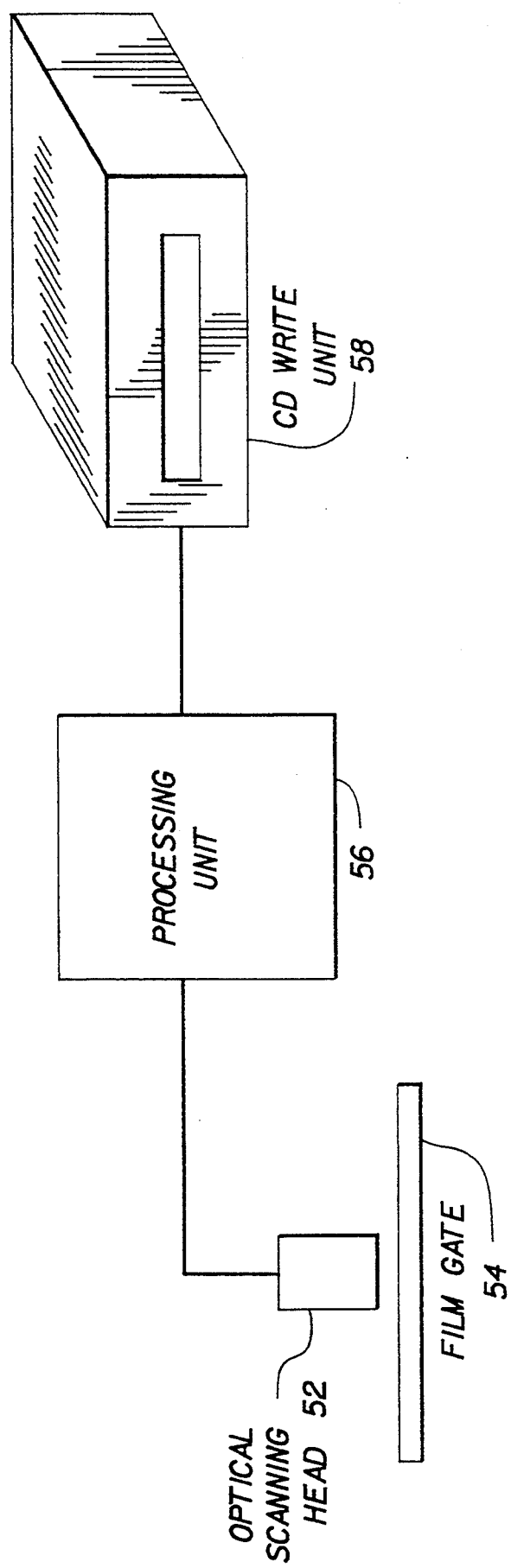

CAMERA INCLUDING OPTICAL ENCODING OF AUDIO INFORMATION

FIELD OF THE INVENTION

The invention relates in general to methods and apparatus for optically recording audio information on photographic film. More specifically, the invention relates to a photographic still camera that records audio information corresponding to a plurality of picture film frames in an audio film frame located adjacent to the last picture film frame.

BACKGROUND OF THE INVENTION

Image information systems have recently been introduced in which photographic film images are scanned and stored in digital form on optical compact storage discs (CD's) for subsequent reproduction and display. The optical storage discs can be utilized to store audio information as well as image information. It is therefore desirable to provide a system in which audio information corresponding to the photographic film image is recorded when the photographic image is exposed, so that the photographic film image and the recorded audio information can subsequently be stored together on the storage disc.

One approach to recording audio information related to a photographic image would be to provide a camera with a sound recording system that records the audio information on an audio storage medium. The sound storage medium could take the form of a magnetic tape, a magnetic information storage disc, or a semiconductor memory that can be detached from the camera and sent with a film roll to a processing facility. The processing facility would then develop the film image, scan the film image to create digitized image data, and store the digitized image data on the storage disc. The audio information contained on the sound storage medium corresponding to the film roll would also be recorded onto the storage disc.

There are a number of problems associated with the use of a separate audio recording medium to record the audio information as described above. The complexity and expense of the photographic camera system, for example, increases due to the requirement of providing a separate audio recording medium within the camera structure. The audio recording medium can also become separated from the photographic film at several different points in the overall process, thereby requiring that a tracking system be employed to insure that the audio recording medium and photographic film are properly mated prior to recording the image and audio information on the storage disc.

In view of the difficulties associated with the use of a separate recording medium, it is an objective of the invention to provide a camera system that records the audio information directly on the photographic film used to record the image, thereby overcoming the problem of having the audio information becoming separated from the corresponding image information during processing operations. It is a further objective of the invention to provide a camera system that optically records the audio information on the photographic film in a manner that optimizes the number of images that can be captured on the film.

SUMMARY OF THE INVENTION

The invention provides a camera system that optically records audio information on a photographic film containing corresponding image information. The audio information is recorded on an audio film frame located at the end of the photographic film adjacent to the last picture film frame recorded thereon. The length of the audio film frame is varied based on the amount of audio information to be recorded in order to optimize the number of photographs that can be recorded on the film.

The camera system includes a user interface coupled to a camera control processor, a recording circuit coupled to the camera control processor and a microphone, an optical encoding circuit having an input coupled to the output of the recording circuit and an output coupled to an optical write head, a shutter mechanism, and a transport mechanism for advancing film past the shutter mechanism and the optical write head. In operation, the camera control processor, in response to command signals received from the user interface, controls the operation of the recording circuit, the optical encoding circuit, the optical write head, the shutter mechanism and the transport mechanism, to record audio segments of variable duration and to encode the audio segments as an audio film frame at a location adjacent to the last picture film frame as the transport mechanism advances film past the optical write head.

A playback circuit and speaker are also preferably included in the camera system. The camera control processor, in response to a command signal received from the user interface, controls the operation of the playback circuit to playback the recorded audio segments on the speaker. The operator can therefore review the acceptability of the audio segments prior to having the audio segments encoded.

BRIEF DESCRIPTION OF THE DRAWINGS

With the above as background, reference should now be made to the following detailed description of the preferred embodiment of the invention and the accompanying drawings, wherein:

FIG. 6 illustrates a scanning system for scanning the film segment illustrated in FIG. 5.

DETAILED DESCRIPTION OF THE PREFERRED EMBODIMENT

Figure 1:
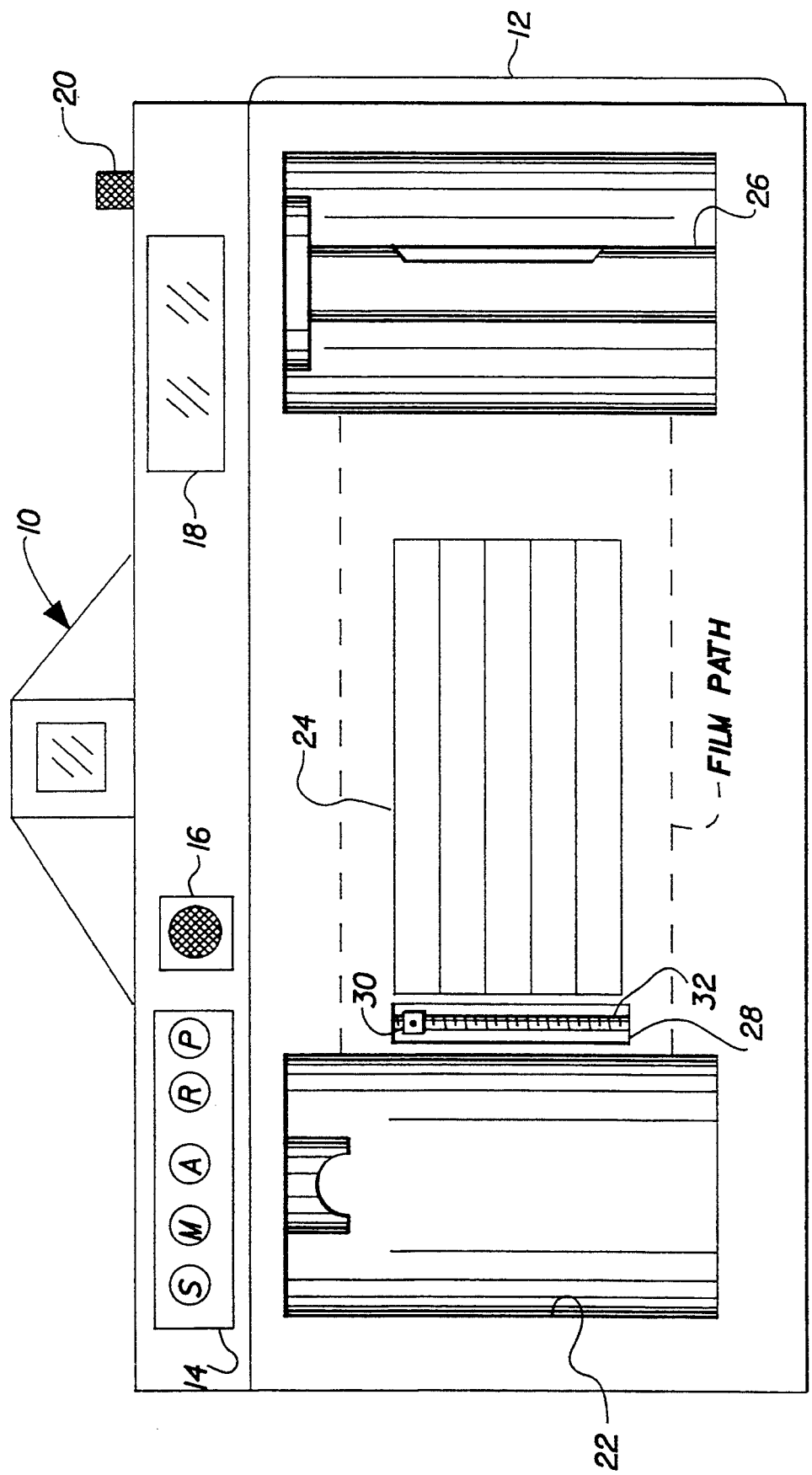
FIG. 1 is an illustration of a back side of a camera incorporating the invention.

A back view of a single lens reflex type camera incorporating the invention is illustrated in FIG. 1. For purposes of illustrating the invention, the camera 10 is shown without its back cover plate which would normally cover a lower portion 12 thereof. The camera 10 includes a user interface 14 having a plurality of control buttons and/or switches to permit an operator to enter various commands into a camera control processor (not shown), a speaker 16 for replaying recorded audio information, as will be described in greater detail below, a liquid crystal display (LCD) 18 for displaying various information concerning the operation of the camera, and a microphone 20 for recording audio information. The camera 10 further includes a conventional film cartridge storage slot 22, a shutter mechanism 24, and a film take-up spool 26 (motor driven) which is used to wind film from a film cartridge along the camera's film path after each exposure. In addition, a slot 28 containing an optical write head 30 is preferably located between the storage slot 22 and the shutter mechanism 24. The optical write head 30 is attached to a lead screw 32 which is driven by an optics unit motor (not shown in FIG. 1), thereby permitting the optical write head 30 to move back and forth within the slot 28.

Figure 2:
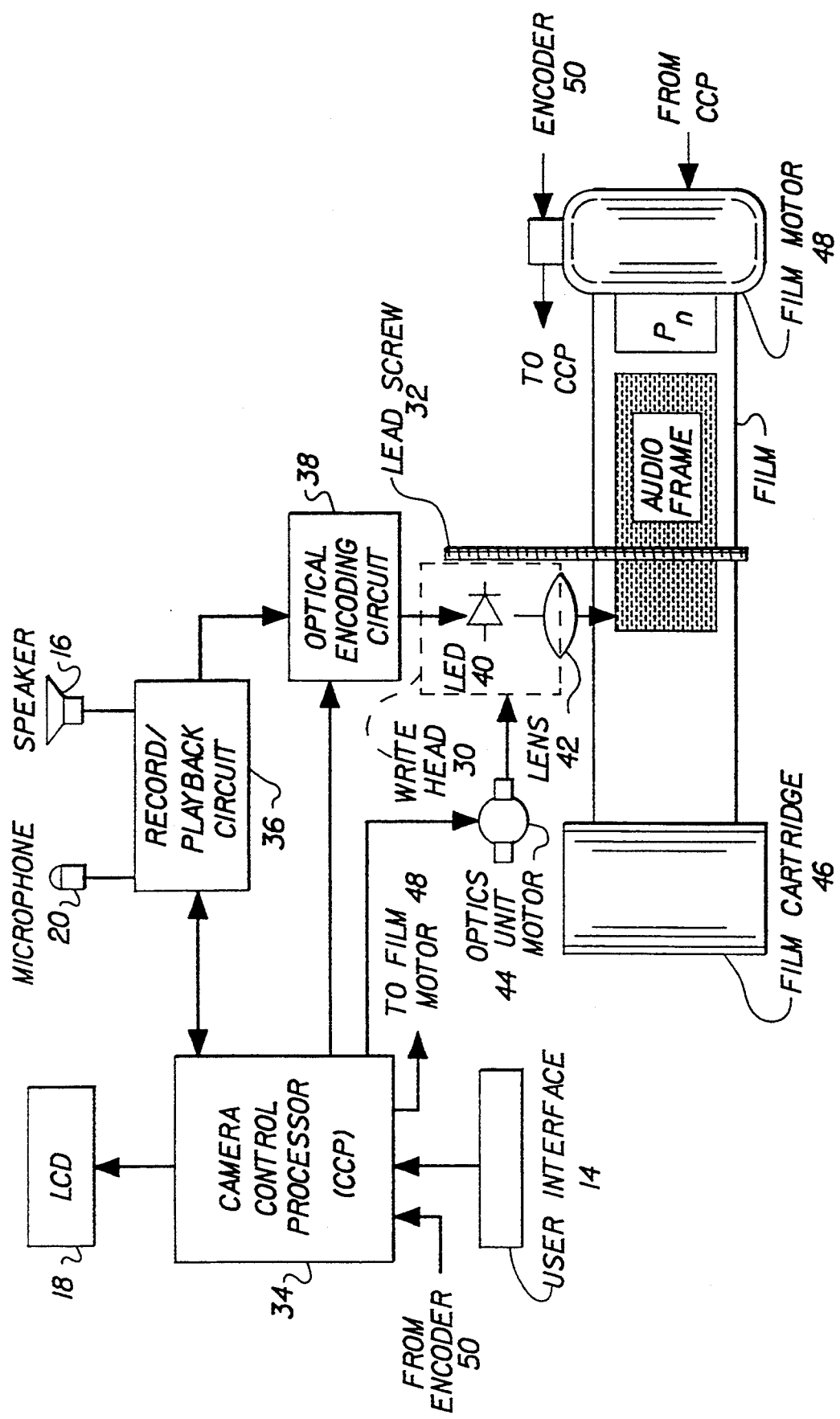
FIG. 2 is a schematic block diagram of the electronics system for the camera illustrated in FIG. 1.

An electrical schematic diagram of the camera 10 is illustrated in FIG. 2. As was mentioned above, the user interface 14 and LCD 18 are coupled to the camera control processor 34, which controls the overall operation of the camera 10 in accordance with commands entered by the operator via the user interface 14. The microphone 20 and the speaker 16 are coupled to a record/playback circuit 36, which is controlled by the camera control processor 34 and has an output coupled to an optical encoding circuit 38. The record/playback circuit 36 includes a preamplifier, automatic gain control, filters, power output amplifiers and a nonvolatile analog memory. The output of the optical encoding circuit 38 is coupled to the optical write head 30 which includes an LED 40 and a lens assembly 42. The optical encoding circuit 38 varies the current supplied to the LED 40 in proportion to the output of the record/playback circuit 36. The camera control processor 34 also controls the current passing through the LED 40 based on the ISO film speed of the film to be exposed in the film path. As a result, the write head 30 causes exposure variations to be recorded on film located in the camera's film path which are proportional to the originally recorded audio.

In operation, the camera 10 is loaded with film by placing a film cartridge 46 into the film cartridge storage slot 22 and threading the film take-up spool 26 in a conventional manner. In the illustrated embodiment, the film take-up spool 26 is preferably driven by transport mechanism utilizing a film motor 48 under control of the camera control processor 34, such that the film is automatically threaded and advanced to a first picture frame position when the camera back is closed. Although not shown, the camera 10 preferably includes decoding circuitry to decode a DX code contained on the film cartridge, which is indicative of the film speed and number of exposures for the film contained in the cartridge. This information is supplied to the camera control processor 34.

The user enters a command via the user interface to initiate an audio recording mode of operation for a given picture film frame. The camera control processor 34, in response to the command entered via the user interface, activates the record/playback circuit 36 to record and store an audio segment in the memory contained within the record/playback circuit 36. It should be noted that the actual recording of the audio segment by the record/playback circuit 36 can take place either before, after or during the exposure of each picture frame (P1 . . . Pn), and the duration of each audio segment can vary based on commands entered by the operator. For example, in a manual mode of operation, the operator selects a manual mode button (M) on the user interface 14 that causes the camera control processor 34 to initiate recording for as long as the manual mode button is depressed up to a preset maximum (for example fifteen seconds) for a given picture film frame. The manual mode button can be used to record an audio segment prior to exposure of the corresponding picture film frame or after exposure of the corresponding picture film frame. To initiate an automatic mode of operation, the operator selects an automatic mode button (A) on the user interface 14 which causes the camera control processor 34 to display a message on the LCD 18 asking the operator to select the length of the recording segment. For example, the camera control processor 34 first displays the phrase "SELECT TIME" on the LCD 18 and subsequently displays the number of seconds to be selected in descending order ("15 SECS" . . . "14 SECS" . . . "13 SECS") until the operator activates the automatic mode button a second time to stop the countdown. The camera control processor 34 then activates the record/playback circuit 36 to record an audio segment of the selected duration when the shutter button (S) is activated to expose a picture film frame.

Figure 3:
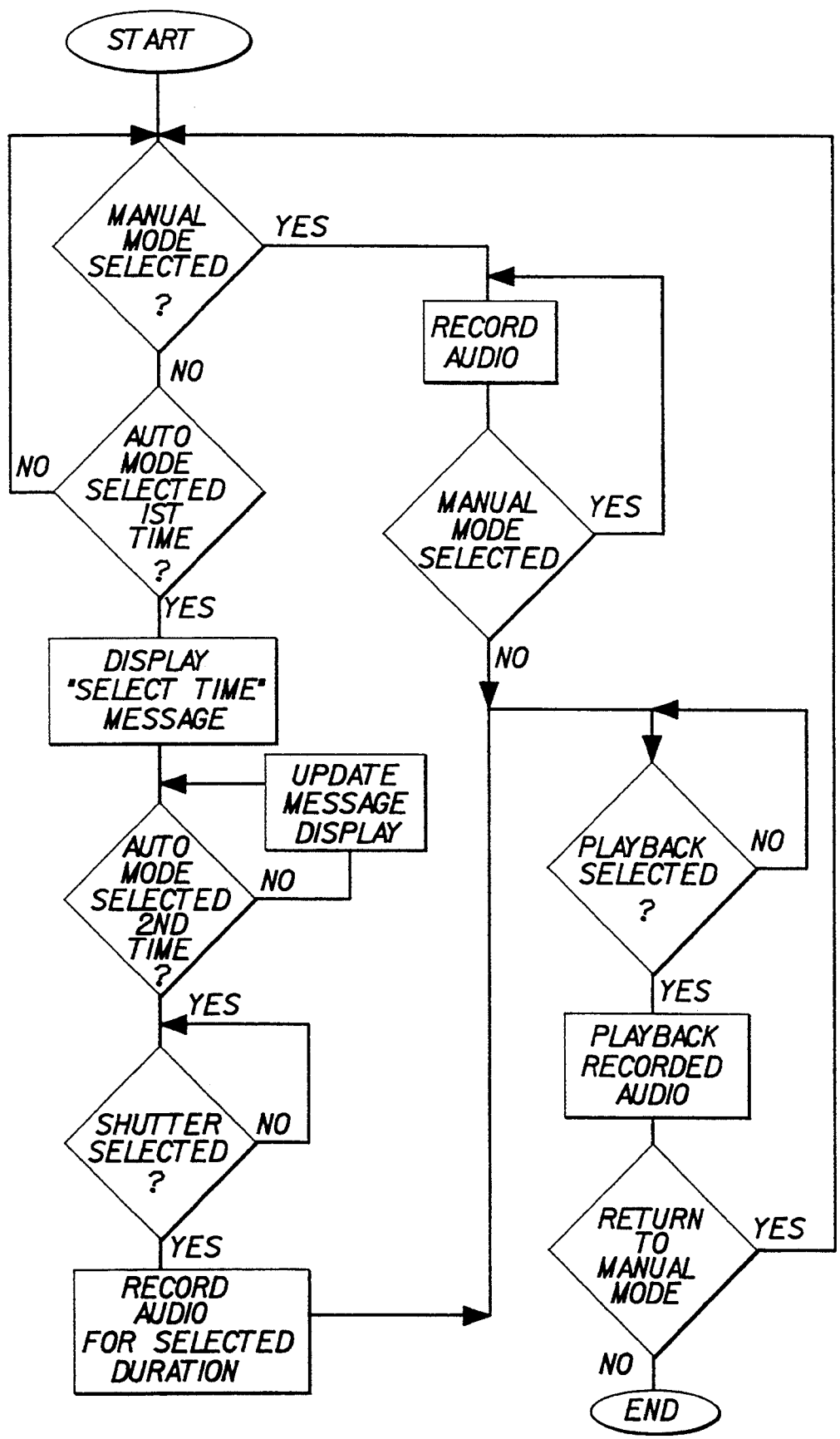
FIG. 3 is a flow diagram of the operation of the electronics system illustrated in FIG. 2 in order to select the duration of an audio segment.

The operator also has the opportunity of reviewing the recorded audio segment by activating a playback button (P) on the user interface 14. Upon activation of the playback button, the camera control processor 34 controls the operation of the record/playback circuit 36 to playback the recorded audio segment from memory using the speaker 16. If the audio segment does not meet with the approval of the operator, the manual operation mode can be selected to record a new audio segment. The above operations are illustrated by the flow diagram shown in FIG. 3.

The camera control processor 34 keeps a record of the number of picture film frames that have been exposed and the total duration of all of the audio segments corresponding to the picture film frames, and performs a calculation to determine whether sufficient space remains on the film to expose another picture film frame while allowing sufficient space to encode all of the audio segments in an audio film frame. For example, assuming a film cartridge having a total film length of TF and N picture film frames have been exposed with a total time for all audio segments of S seconds, the camera control processor 34 multiples the number of picture film frames N by the known length of a picture film frame LF, divides the number of seconds S used by all of the audio segments by a known conversion factor CF, which relates the length of film required to encode an audio segment of a specified duration (for example 0.5 seconds/millimeter), and adds the results of these two operations to determine the total amount of film used TFU. The camera control processor 34 then subtracts the total amount of film used TFU from the total film length TF to determine the total amount of film remaining TFR, and compares the total amount of film remaining TFR with the known length of a picture frame LF to determine whether an additional picture frame can be exposed.

Figure 4:
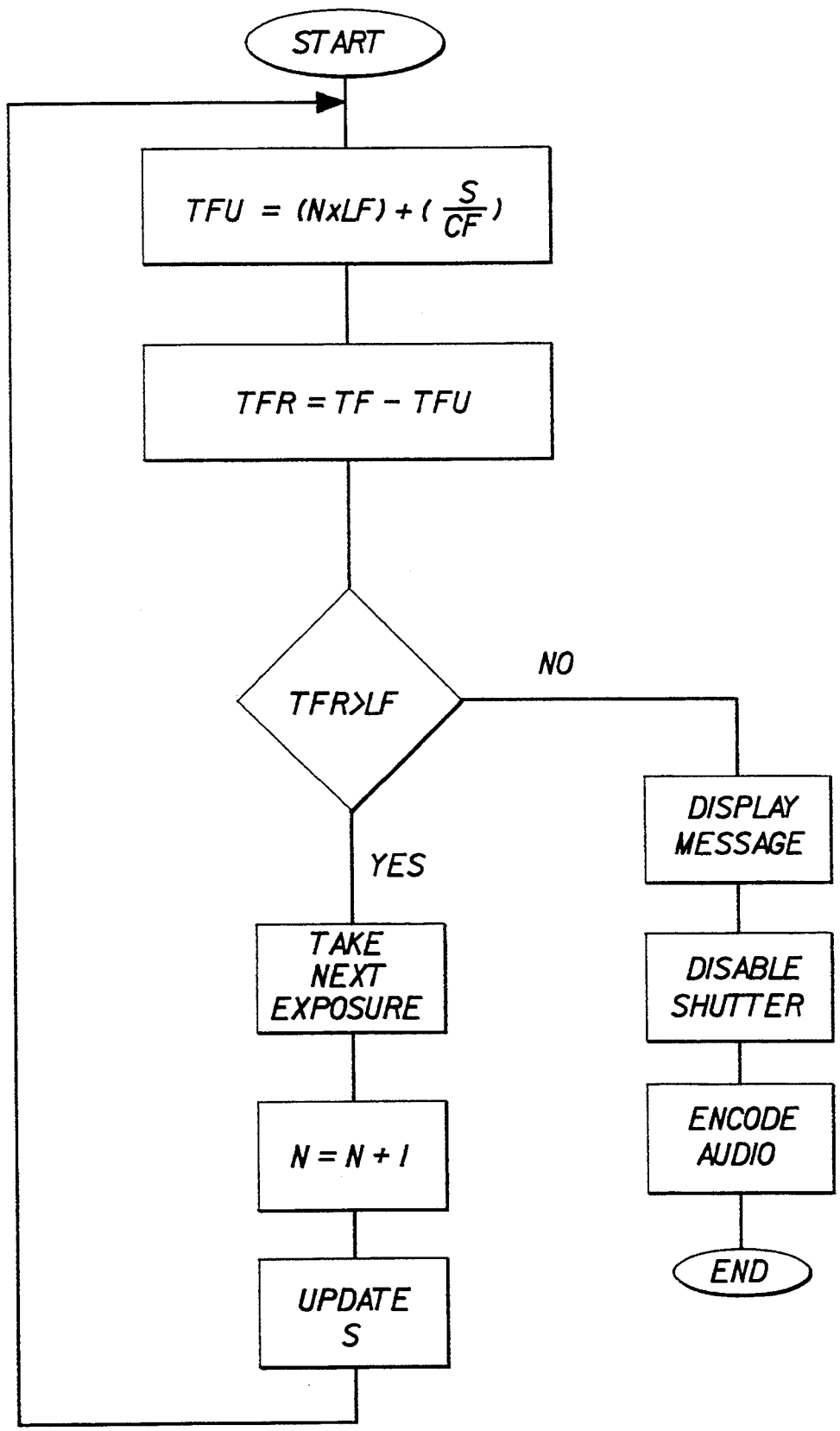
FIG. 4 is a flow diagram illustrating the determination of whether sufficient film remains to expose an additional picture film frame.

If an additional picture frame cannot be exposed, the camera control processor 34 displays a message on the LCD 18 to indicate to the operator that further exposures cannot be taken, disables the shutter, and enters an audio segment encoding mode. The camera control processor 34 activates the film motor 48 to drive the film past the write head 30 and simultaneously activates the optical encoding circuit 38 and the optics unit motor 44 to optically encode the audio segment stored in the record/playback circuit 36 onto an audio film frame. The film motor 48 continues to operate until the record/playback circuit 36 sends a signal to the camera control processor 34 indicating the completion of encoding. The camera control processor 34 then commands the film motor 48 to stop. The film is then rewound into the film cartridge 46 (either manually or by a motorized drive) and removed from the camera for processing. FIG. 4 is a flow diagram illustrating the above operations.

If an additional picture frame can be exposed, but insufficient space remains to record a corresponding full duration audio segment, the camera control processor 34 displays a message on the LCD 18 indicating that the audio segment for the next picture frame must be limited to a specific duration.

Figure 5:
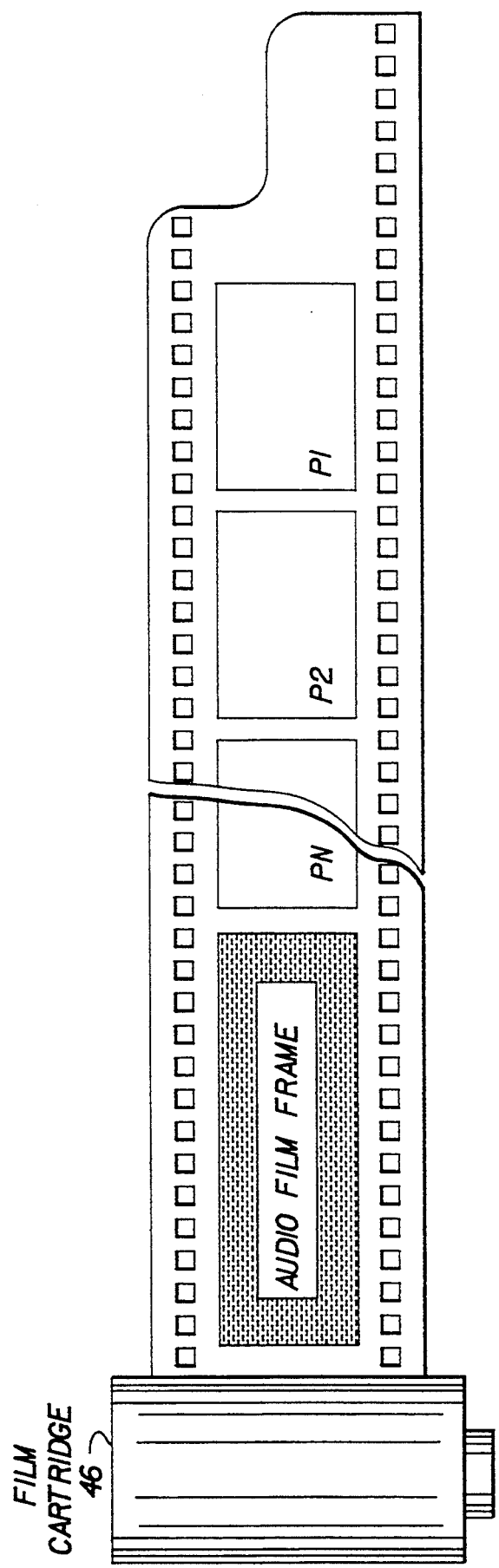
FIG. 5 illustrates a photosensitive film having a plurality of picture film frames and an audio film frame located adjacent to the last picture film frame.

The invention insures that the maximum number of picture frames are exposed on a given roll of film, by permitting variable length audio segments to be recorded for each of the picture frames, such that the length of the audio film frame can be varied. For example, the memory employed in the record/playback circuit 36 can preferably store a fifteen second audio segment for each picture frame. In many cases, however, the operator may wish to use only five or ten second seconds to narrate a particular image. In such cases, a great deal of film space would be wasted if the audio frame length were fixed to provide sufficient space for encoding the fifteen second maximum for each image. In contrast, the invention insures that the audio frame length will be limited to the minimum amount of space required. FIG. 5 illustrates the placement of the audio film frame after the last picture film frame Pn.

The audio film frame is preferably encoded as a continuous data stream containing start and stop codes identifying individual audio segments contained therein with corresponding picture film frames. Alternatively, the audio film frame can be encoded as a series of subframes that are spaced apart on the film.

FIG. 6 illustrates a scanning unit for scanning a film having a plurality of picture film frames and an audio film frame of the type illustrated having an optical scanning head 52 that scans film placed in a film gate 54. The film can be transported through the gate either manually or through the use of an automatic transport mechanism (not shown). The output from the optical scanning head 52 is supplied to a processing unit 56 which converts the signal from the scanning head 52 into a digital signal. The scanning head 52 is used to scan both the picture and audio frames contained on the film. The processing unit 56 identifies the audio frames based on the start and/or stop codes contained therein, and supplies the digital signal representative of a picture frame and its corresponding audio frame to a CD write unit 58 which writes the digital signal on a CD.

The invention has been described with reference to certain preferred embodiments thereof. It will be understood, however, that modifications and variations are possible within the scope of the appended claims. For example, the write head 30 can alternatively be located between the shutter mechanism 24 and the take-up spool 26. The write head 30 can also take the form of a linear array of LED's that span the width of the audio film frame or a scanning beam can be employed instead of a movable write head. The playback feature can also be eliminated to further reduce the expense and complexity of the camera. In such a case, the microphone 16 would be eliminated and the record/playback circuit 36 would be replaced by a similar record only circuit. Other modes of operation can also be employed. For example, a timer mode can be utilized wherein the audio recording is started a preset time before the shutter is initiated by a timing mechanism and continues until a preset time after the shutter has been activated. The invention can also be utilized in camera structures other than the illustrated single lens reflex camera.

Parts List

10 Camera
12 Lower Camera Portion
14 User Interface
16 Speaker
18 Liquid Crystal Display (LCD)
20 Microphone
22 Film Cartridge Storage Slot
24 Shutter Mechanism
26 Film Take-Up Spool
28 Slot
30 Write Head
32 Lead Screw
34 Camera Control Processor
36 Record/Playback Circuit
38 Optical Encoding Circuit
40 LED
42 Lens Assembly
46 Film Cartridge
48 Film Motor
52 Optical Scanning Head
54 Film Gate
56 Processing Unit
58 CD Write Unit

What is claimed is:

1. A camera comprising: a user interface coupled to a camera control processor; a recording circuit coupled to the camera control processor and a microphone; an optical encoding circuit having an input coupled to the output of the recording circuit and an output coupled to an optical write head; a shutter mechanism; and transport means for advancing film past the shutter mechanism and the optical write head; wherein the camera control processor, in response to command signals received from the user interface, controls the operation of the recording circuit, the optical encoding circuit, the optical write head, the shutter mechanism and the transport mechanism, to expose a plurality of picture film frames on a photosensitive film, record audio segments of variable duration that correspond to the picture film frames, and encode the audio segments as an audio film frame on the photosensitive film adjacent to a last picture film frame of the plurality of picture film frames, at a location intermediate the last picture film frame and an end of the photosensitive film, as the transport means advances the photographic film past the optical write head.

2. A camera as claimed in claim 1, further comprising a playback circuit coupled to a speaker, wherein said camera control processor, in response to a command signal received from the user interface, controls the operation of the playback circuit to playback the recorded audio segments on the speaker.

3. A camera as claimed in claim 1, further comprising a display unit, and wherein the camera control processor determines whether a sufficient amount of film remains to encode the audio film frame after each exposure of a picture film frame and displays a message on a display unit of the camera indicative of whether additional picture film frames can be exposed.

4. A camera as claimed in claim 1, wherein the optical write head is located between the shutter mechanism and a film cartridge storage slot of the camera.

5. A camera system comprising: means for exposing a photosensitive film to a plurality of images to form a plurality of picture film frames thereon; means for recording an audio segment corresponding to at least one of the plurality of picture film frames; means for selecting the duration of the audio segment to be recorded; means for optically encoding the recorded audio segment as an audio film frame on the photosensitive film adjacent to a last picture film frame of the plurality of picture film frames at a location intermediate the last picture film frame and an end of the photosensitive film.

6. A camera system as claimed in claim 5, further comprising means for audibly reproducing the recorded audio segments.

7. A photosensitive film comprising: a plurality of picture film frames and an encoded audio film frame located intermediate a last picture film frame of the plurality of picture film frames and an end of the photosensitive film; wherein the audio film frame includes data for a plurality of audio segments that correspond to the plurality of picture film frames.

* * * * *